United States Patent
Koehler

(10) Patent No.: US 11,306,666 B2
(45) Date of Patent: Apr. 19, 2022

(54) METHOD FOR DETECTING COKING IN THE INLET SECTION OF AN INTERNAL COMBUSTION ENGINE WITH A VARIABLE INLET VALVE LIFT CONTROLLER

(71) Applicant: Bayerische Motoren Werke Aktiengesellschaft, Munich (DE)

(72) Inventor: Joerg Koehler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/281,656

(22) PCT Filed: Oct. 15, 2019

(86) PCT No.: PCT/EP2019/077877
§ 371 (c)(1),
(2) Date: Mar. 31, 2021

(87) PCT Pub. No.: WO2020/083704
PCT Pub. Date: Apr. 30, 2020

(65) Prior Publication Data
US 2021/0372331 A1    Dec. 2, 2021

(30) Foreign Application Priority Data
Oct. 25, 2018 (DE) .................... 10 2018 126 692.8

(51) Int. Cl.
*F02D 13/02* (2006.01)
*F02D 41/14* (2006.01)
(Continued)

(52) U.S. Cl.
CPC ..... *F02D 13/0226* (2013.01); *F02D 41/0002* (2013.01); *F02D 41/1456* (2013.01);
(Continued)

(58) Field of Classification Search
CPC ............. F02D 13/0226; F02D 41/0002; F02D 41/1456; F02D 41/22; F02D 41/2451; F02D 2041/001; F02D 2041/002
See application file for complete search history.

(56) References Cited

U.S. PATENT DOCUMENTS 6,892,691 B1    5/2005 Uhl et al.
10,519,887 B1* 12/2019 Thompson ....... F02M 35/10386
(Continued)

FOREIGN PATENT DOCUMENTS

DE    199 45 813 A1    3/2001
DE    103 39 251 A1    3/2005
(Continued)

OTHER PUBLICATIONS

International Search Report (PCT/ISA/210) issued in PCT Application No. PCT/EP2019/077877 dated Jan. 17, 2020 with English translation (four (4) pages).
(Continued)

*Primary Examiner* — George C Jin
(74) *Attorney, Agent, or Firm* — Crowell & Moring LLP

(57) ABSTRACT

A method detects coking in the inlet section of an internal combustion engine with direct fuel injection, a throttle valve and a variable inlet valve lift controller. A correction value calculated by the inlet valve lift controller as an offset value with a preset valve lift is determined. In parallel, a first quantity deviation test is carried out by which a first air ratio value is determined, which is formed from a first lambda value measured during the first quantity deviation test and a desired lambda value of the fuel combustion in the combustion chambers of the internal combustion engine, wherein, in the first quantity deviation test a load control process is carried out by way of the variable inlet valve lift controller. In a second quantity deviation test, a second air ratio value is determined which is formed from a lambda
(Continued)

value measured during the second quantity deviation test and a desired lambda value of the fuel combustion. In the second quantity deviation test a load control process is carried out by way of the throttle valve. A comparison value is formed from the first air ratio value and the second air ratio value. Whether coking is present in the inlet section of the internal combustion engine is determined by combined evaluation of the comparison result and of the correction value.

15 Claims, 1 Drawing Sheet

(51) Int. Cl.
  *F02D 41/00* (2006.01)
  *F02D 41/22* (2006.01)
  *F02D 41/24* (2006.01)
(52) U.S. Cl.
  CPC ......... *F02D 41/22* (2013.01); *F02D 41/2451* (2013.01); *F02D 2041/001* (2013.01); *F02D 2041/002* (2013.01)

(56) References Cited

U.S. PATENT DOCUMENTS

| | | | | |
|---|---|---|---|---|
| 2004/0045533 A1* | 3/2004 | Sukegawa | ............. | F02D 41/003 123/478 |
| 2004/0186653 A1* | 9/2004 | Bleile | ..................... | F02D 37/02 701/103 |
| 2005/0125139 A1 | 6/2005 | Keller et al. | | |
| 2007/0283933 A1* | 12/2007 | Magner | ............... | F02D 13/0261 123/491 |
| 2011/0004394 A1 | 1/2011 | Dingl et al. | | |
| 2014/0033811 A1 | 2/2014 | Hoffmann et al. | | |
| 2014/0318498 A1 | 10/2014 | Rumpsa et al. | | |
| 2015/0136079 A1 | 5/2015 | Grasreiner | | |
| 2017/0184044 A1 | 6/2017 | Grasreiner | | |

FOREIGN PATENT DOCUMENTS

| | | |
|---|---|---|
| DE | 10 2006 034 633 A1 | 1/2008 |
| DE | 10 2011 005 283 B4 | 5/2013 |
| DE | 10 2012 213 241 A1 | 2/2014 |
| DE | 10 2014 105 270 A1 | 10/2014 |
| DE | 102 56 906 B4 | 10/2017 |
| DE | 10 2016 219 067 A1 | 4/2018 |
| DE | 10 2017 219 322 A1 | 5/2019 |
| JP | 2005-214073 A | 8/2005 |
| WO | WO 2016/041742 A1 | 3/2016 |

OTHER PUBLICATIONS

German-language Written Opinion (PCT/ISA/237) issued in PCT Application No. PCT/EP2019/077877 dated Jan. 17, 2020 (eight (8) pages).

German-language Search Report issued in German Application No. 10 2018 126 692.8 dated Aug. 14, 2019 with partial English translation (11 pages).

* cited by examiner

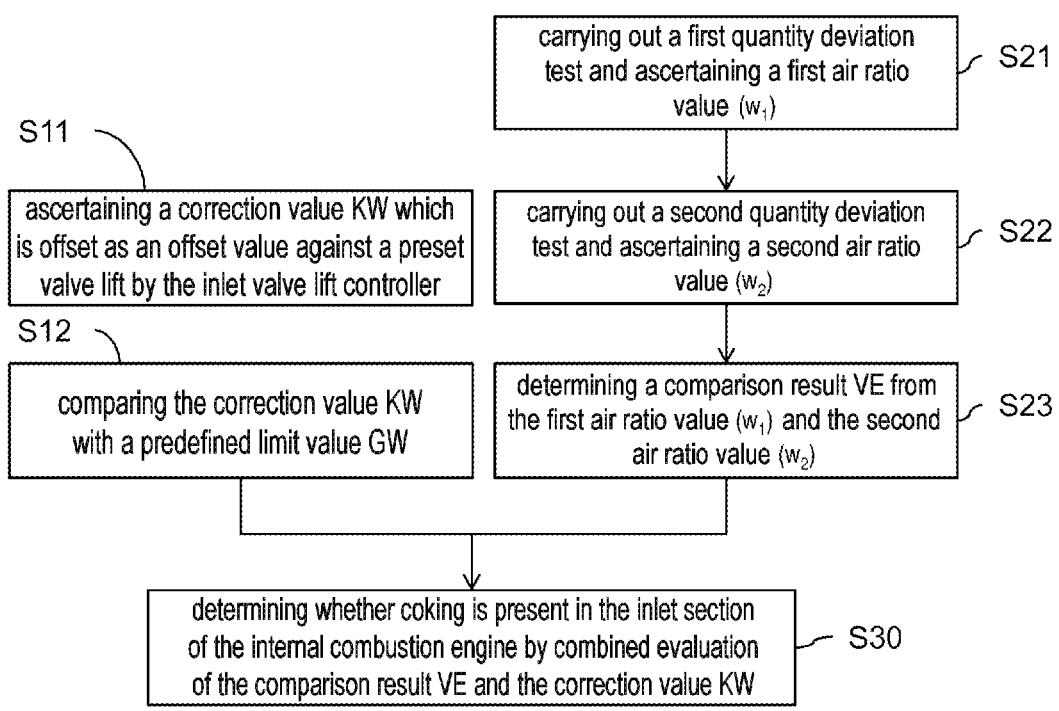

METHOD FOR DETECTING COKING IN THE INLET SECTION OF AN INTERNAL COMBUSTION ENGINE WITH A VARIABLE INLET VALVE LIFT CONTROLLER

BACKGROUND AND SUMMARY OF THE INVENTION

The invention relates to a method for detecting coking in the inlet section of an internal combustion engine which has direct fuel injection, a throttle flap and a variable inlet valve lift controller, and to a corresponding engine test unit.

In the case of Otto-cycle engines with gasoline direct injection, coking of the inlet section can occur, in particular at the inlet valve (for example at the valve neck) or in the inlet channel at the valve opening. In the case of such coking, carbon-like material accumulates in the inlet section. A cause for the coking tendency in Otto-cycle engines with gasoline direct injection is that, in the case of Otto-cycle engines with gasoline direct injection, no continuous cleaning purging of the inlet section, for example of the inlet valve, with gasoline occurs, because the fuel is injected directly in the combustion chamber. Oil residues from the crankcase ventilation system, the valve shank seal or the turbocharging arrangement can, in conjunction with soot particles from the cylinder, accumulate in the form of carbon in the inlet under the action of heat. Here, the coking tendency tends to increase with the use of fuels and oils of low quality and in the case of low-load driving profiles.

The coking results in an impairment of the running smoothness during cold idling and can lead to increased fuel consumption and complaints with regard to warm-up driving characteristics. A coking film for example at the top on the valve neck between valve disk and valve shank can disrupt the tumbling flow, such that the idling rotational speed fluctuates to a greater degree and, in the extreme case, misfiring may even occur. A coking film may even lead, as a flow resistance, to a drop in power owing to inadequate cylinder charging. Furthermore, a coking film on the inlet valve or on the valve opening can prevent a correct closure of the valve, such that compression losses and sporadic misfiring occur.

The degree of coking in the inlet section can typically be visually established in the workshop only after a dismounting of engine parts. If the inlet section has become correspondingly coked, then the inlet section is cleaned, or the components involved are exchanged.

The visual detection of coking has the disadvantage of a large amount of working effort for the dismounting of the engine parts in order to attain visual accessibility. Furthermore, the visual examination is associated with the disadvantage of a lack of objectivity, because the coking is difficult to assess from a purely visual inspection.

The document DE 10 2012 213 241 A1 has disclosed a method which, for the detection of coking in the inlet section of an internal combustion engine with direct fuel injection, does not require dismantling of the internal combustion engine and allows an objective assessment of the coking. The method described in said document can however be used only in internal combustion engines with phase adjustment of the valve opening times (so-called variable inlet valve control), in the case of which the control of an air mass flow is performed by means of a throttle flap. In the case of this method, the internal combustion engine, when idling, is operated with an idling rotational speed which is increased in relation to normal idling operation. Furthermore, the opening time of the inlet valves is advanced by means of the variable inlet valve controller, whereby the valve overlap (the duration for which the inlet valve is opened already before the outlet valve is closed) is increased. By measurement, a running roughness characteristic variable of the internal combustion engine, which is characteristic of the running roughness of the internal combustion engine, is then determined. On the basis of the running roughness characteristic variable, it is then possible to detect the presence of coking in the inlet section.

This method however cannot be used in internal combustion engines in which the control of the air mass flow is performed by means of a variable inlet valve lift controller, because the combustion process is configured differently. Whereas, in the case of an internal combustion engine with throttling load controller, the residual gas control is performed via the inlet, it is the case in an internal combustion engine with variable inlet valve lift controller that the residual gas control is implemented via the outlet. An internal combustion engine with variable inlet valve lift controller involves a fully variable mechanical valve controller. By means of this system, the load control is regulated not by means of the throttle flap but by means of a valve lift curve. In this way, the charge exchange losses during part-load operation of the internal combustion engine can be considerably reduced, and thus a consumption advantage can be attained.

It is an object of the invention to provide a method for detecting coking of an internal combustion engine with direct fuel injection and variable inlet valve controller, which method requires no dismantling of the internal combustion engine for the purposes of the detection, and which method allows at least an indication of the presence of coking to be attained. Furthermore, the object is directed to providing an engine test unit with corresponding characteristics.

The object is achieved by means of the features of the independent patent claims. Advantageous embodiments are specified in the dependent claims.

A first aspect of the invention relates to a method for detecting coking in the inlet section of an internal combustion engine. The internal combustion engine has one or more cylinder banks, wherein a respective cylinder bank comprises multiple cylinders with in each case one combustion chamber formed therein and at least one injection nozzle. In particular, exactly one injection nozzle is provided in each combustion chamber. A common air mass flow is fed to the combustion chambers of a respective cylinder bank. Likewise, a common exhaust-gas flow is discharged from the combustion chambers of a respective cylinder bank. The internal combustion engine has direct fuel injection, and is in particular an Otto-cycle engine with gasoline direct injection.

The method is executed for example on an engine test unit external to a vehicle, which engine test unit is used for example in a vehicle repair workshop. The engine test unit is connected to the engine controller of the vehicle wirelessly or by wires via a corresponding vehicle interface, and, via this, can control the operation of the vehicle and retrieve measured values from the engine controller. It is also contemplated for the method to be executed on the engine control unit of the vehicle, wherein, for example in the event of the detection of a fault, in particular of coking, cleaning of the inlet channels and/or of the inlet valves is instructed. For this purpose, an instruction to perform cleaning may be output to the driver or to a technician in the workshop, and/or a corresponding instruction may be stored in a fault memory of the vehicle.

The internal combustion engine has a throttle flap in the inlet section and a variable inlet valve lift controller (also referred to as VVT, variable valve drive). The variable inlet valve lift controller makes it possible to regulate the valve lift. With the variable valve lift, it is possible for the quantity of air admitted into a combustion chamber of the internal combustion engine to be regulated, such that the throttle flap positioned upstream of a cylinder bank is no longer required during normal operation. The throttle flap is used only in particular operating states, for example in an emergency operating mode. By means of the throttling-free load control, charge exchange losses can be reduced. A higher inflow speed of the air leads to better mixing of the gasoline-air mixture in the combustion chamber.

In the method, a correction value is ascertained which is offset as an offset value against a preset valve lift by the inlet valve lift controller. The correction value makes allowance for the fact that deposits can form on the inlet valves inter alia owing to contaminated air (environment, exhaust-gas recirculation, crankcase ventilation, . . . ). As a result, the cross section is narrowed, and less air can pass into the associated combustion chamber in the case of the same valve lift. During idling, these deposits are particularly critical, because the cross sections are at their smallest here. This can in the worst case lead to rough idling and to misfiring. To avoid this, a valve lift correction is ascertained by means of the correction value. In this way, the adverse effects of the deposits can be compensated to a certain degree.

Furthermore, a first quantity deviation test is carried out. By means of the quantity deviation test, a first air ratio value is ascertained which is formed from a lambda value measured during the first quantity deviation test and a desired lambda value of the fuel combustion in the combustion chambers of the internal combustion engine. In the first quantity deviation test, load control of the internal combustion engine is performed by means of the variable inlet valve lift controller.

Following the first quantity deviation test, a second quantity deviation test is carried out. By means of the second quantity deviation test, a second air ratio value is ascertained which is formed from a lambda value measured during the second quantity deviation test and a desired lambda value for the fuel combustion in the combustion chambers of the internal combustion engine. In the second quantity deviation test, load control of the internal combustion engine is performed by means of the throttle flap arranged in the inlet section.

After the first and the second quantity deviation test have been carried out, a comparison result is formed from the first air ratio value and the second air ratio value. An indicator for the presence of a fault in the inlet section of the internal combustion engine is provided on the basis of the comparison result.

The first and the second quantity deviation test may be carried out after the ascertainment of the correction value. The first and the second quantity deviation test may be carried out before the ascertainment of the correction value. The first and the second quantity deviation test may be carried out in parallel with the ascertainment of the correction value.

A determination as to whether coking is present in the inlet section of the internal combustion engine is performed by combined evaluation of the comparison result and of the correction value. Each of the two criteria constitutes an indication of the presence of coking in the inlet section. By means of the combined evaluation, a more reliable statement can be made regarding the presence of coking in the inlet section.

No change to the fuel path, that is to say to the delivery of the required fuel mass for the combustion, occurs while the first and the second quantity deviation test are being carried out. By contrast, by means of the different load control, on the one hand by means of the variable inlet valve lift controller and on the other hand by means of the throttle flap, the air path is changed if a fault or coking is present in the inlet section.

The method according to the invention makes it possible to objectively identify coking in the inlet section of an internal combustion engine with direct fuel injection. The objective identification is performed by measurement and the use of further parameters which are available in the vehicle rather than by subjective visual assessment. Cleaning and/or repair is thus performed only when this is actually objectively required.

With the use of the method described herein, dismantling of the internal combustion engine solely for the visual assessment of coking is not necessary. Coking can be identified in a very short time. The duration for identifying whether a fault in the inlet section of the internal combustion engine, in particular coking, is present may lie for example within approximately ten minutes rather than one hour or more in the case of dismantling of the internal combustion engine. With the aid of the described method, it is no longer necessary for the engine to be disassembled, whereby further causes of faults for the repairs to be carried out can be minimized to those which are absolutely necessary. Furthermore, the accuracy of the detection of coking by means of a balancing mixture deviation method carried out according to the invention is considerably higher than is the case in the prior art.

In one expedient refinement, the correction value is read out of the engine controller. In general: the higher the absolute value of the correction value, the more likely it is that there are extensive deposits on the inlet valves.

The correction value is in particular a value ascertained in relation to the running time of the internal combustion engine by the engine controller. The correction value is furthermore a value adapted in relation to the running time of the internal combustion engine by the engine controller, wherein an adaptation is performed from a theoretically calculated air mass value of air flowing into the combustion chambers of the internal combustion engine and a measured air mass value.

The correction value is, for or in the context of the combined evaluation, compared with a predefined limit value, wherein the presence of a fault in the inlet section is inferred if the correction value exceeds the predefined limit value. The predefined limit value may, for example after the manufacturer of the internal combustion engine, be written into a memory of the engine controller. Over the course of time, the correction value may then be adapted in relation to the running time of the internal combustion engine, as has hitherto also been the case in internal combustion engines with inlet valve lift control. For the carrying-out of the method according to the invention, the currently present correction value is processed. It may optionally be provided that a change in the correction value over time, for example since the first commencement of operation of the vehicle, is also processed.

The exceedance of the predefined limit value alone constitutes merely an indication of the presence of coking. A fault signal which represents coking is expediently output only if, additionally, the first air ratio value and the second air ratio value are different. The combined presence of both conditions at the same time allows a fault statement to be made, with high certainty that coking is present.

The first and/or the second quantity deviation test are expediently carried out during idling operation of the internal combustion engine. The control is performed, as described above, by means of an engine test unit external to the vehicle or the engine controller of the vehicle.

The first quantity deviation test is expediently carried out with the throttle flap open and with a small or even minimal lift of the inlet valve. In other words, the first quantity deviation test is carried out in the so-called unthrottled state, in which the air quantity introduced into a combustion chamber is dependent exclusively on the magnitude of the lift of the inlet valve. Owing to a selected small or minimal lift, the air introduced into the combustion chamber will, in the presence of coking in the inlet channel or on the inlet valve, be manifest in an air quantity which is reduced in relation to the expected air quantity. Since the desired lambda value (that is to say the setpoint lambda value) deviates to a relatively great degree from the measured lambda value, this is manifest in a particular, excessively rich, first air ratio value.

By contrast, the second quantity deviation test is carried out with a maximum lift of the inlet valve and with the throttle flap substantially closed. The load control is thus performed by means of the throttle flap (so-called throttled operation). If coking is present in the inlet channel or on the inlet valve, the second air ratio value will not exhibit a deviation as great as that in the first quantity deviation test, because the cross section through which the air quantity can flow into the combustion chamber is proportionally influenced to a lesser extent by the coking than during the carrying-out of the first quantity deviation test.

The presence of a fault in the inlet section, that is to say in the air path of the internal combustion engine, can thus be inferred if the first air ratio value and the second air ratio value are different. In particular, the presence of coking in the inlet section is inferred if the first air ratio value is lower than a predefined first threshold value and the second air ratio value is higher than or equal to the predefined first threshold value.

The first air ratio value is formed in particular by the quotient of the lambda value measured during the first quantity deviation test and the desired lambda value. The second air ratio value is formed by the quotient of the lambda value measured during the second quantity deviation test and the desired lambda value.

By means of the preferred manner of determination of the first and of the second air ratio value, an indication of coking is present if the first air ratio value is lower than the predefined threshold value and thus lower than the second air ratio value. This arises from the fact that, during the first quantity deviation test, if coking is present, a smaller quantity of air can flow into the combustion chamber then would be the case if no coking were present. The measured lambda value is thus lower than the desired lambda value. By contrast, in the second quantity deviation test, the difference between the measured and the desired lambda value is not as great, because the coking does not cause such a great change in the air volume flowing into the combustion chamber.

The first threshold value is in particular equal to 1.

Also proposed is a computer program product which can be loaded directly into the internal memory of a digital computer and which comprises software code segments by means of which the steps of the method described herein are carried out when the product is executed on a computer. The computer program product may be present in the form of a data carrier, for example a DVD, a CD-ROM, a USB memory stick and the like. The computer program product may also be present as a signal which can be loaded via a wireless or wired network.

A second aspect of the invention is directed to an engine test unit. The engine test unit is configured for detecting coking in the inlet section of an internal combustion engine with direct fuel injection, throttle flap and variable inlet valve controller. The unit is connectable, for example via an electrical connection or a radio connection, to the motor vehicle for the purposes of controlling the operation of the vehicle and for the purposes of receiving vehicle-internal measured values. The engine test unit controls the internal combustion engine via the engine control unit (engine controller) such that the above-described method is carried out.

The invention will be described below with reference to the drawing and on the basis of an exemplary embodiment.

BRIEF DESCRIPTION OF THE DRAWING

FIG. 1 is an exemplary flow diagram of a method for detecting coking in the inlet section of an internal combustion engine.

DETAILED DESCRIPTION OF THE DRAWING

FIG. 1 shows an exemplary flow diagram of the method for detecting coking in the inlet section of an internal combustion engine. The internal combustion engine has one or more cylinder banks, wherein a respective cylinder bank comprises multiple cylinders with in each case one combustion chamber formed therein and at least one injection nozzle. In particular, exactly one injection nozzle is provided in each combustion chamber. A common air mass flow is fed to the combustion chambers of a respective cylinder bank. Likewise, a common exhaust-gas flow is discharged from the combustion chambers of a respective cylinder bank. The internal combustion engine has direct fuel injection, and is in particular an Otto-cycle engine with gasoline direct injection and fully variable valve controller. The control of the internal combustion engine is performed by means of various control parameters stored in an engine controller.

The internal combustion engine comprises a variable inlet valve lift controller in addition to a conventional throttle flap in the inlet section. Said variable inlet valve lift controller is a fully variable mechanical valve controller. By means of this system, the load control is regulated not by means of the throttle flap but by means of a valve lift curve of the inlet valves, as is well known to a person skilled in the art, for which reason this will not be discussed in any more detail. With the variable valve lift, the quantity of air admitted into a combustion chamber of the internal combustion engine can be regulated, such that the throttle flap positioned upstream of a cylinder bank is no longer required during normal operation. The throttle flap is used only in particular operating states, for example in an emergency operating mode. In this way, the charge exchange losses during part-load operation of the internal combustion engine can be considerably reduced, and thus a consumption advantage can be attained.

In the internal combustion engine with variable valve lift controller, a correction value KW provided by the engine controller is processed by the inlet valve lift controller. The correction value KW is offset as an offset value against a preset valve lift by the inlet valve lift controller. The correction value KW makes allowance for the fact that deposits can form on the inlet valves inter alia owing to contaminated inflowing gas masses (from the environment, the exhaust-gas recirculation, the crankcase ventilation, etc.). As a result, the cross section narrows, and less air can pass into the associated combustion chamber in the case of the same valve lift. During idling, these deposits are particularly critical, because the cross sections are at their smallest here. This can in the worst case lead to rough idling and to misfiring. To avoid this, a valve lift correction is ascertained by means of the correction value. In this way, the adverse effects of the deposits can be compensated to a certain degree.

The correction value KW is a value which is ascertained in relation to the running time of the internal combustion engine by the engine controller and which is commonly adapted by the engine controller over time, wherein an adaptation is performed from a theoretically calculated air mass value of air flowing into the combustion chambers of the internal combustion engine. The determination of the correction value KW is performed in accordance with the following approach: a theoretical air mass flow m_theo into the cylinders is calculated with the aid of an operation model of the intake air guide taking into consideration all mass flows and operating states involved. An actual air mass flow m_real is measured either directly or indirectly, wherein, for this purpose, use may for example be made of a hot film air mass sensor HFM. From the ascertained air mass flows, a ratio characteristic number V=m_real/m_theo is formed. The ratio characteristic number V is hereinafter the reference variable of the adaptive regulation, wherein a value of V_ziel=1 is sought, such that the real and the theoretical air mass flow are identical. Said adaptive regulation (so-called adaptation function) varies, as controlled variable, the elements for air mass control, in this case the inlet valve lift EV_hub_offset, wherein a difference resulting from the adaptation corresponds to the correction value KW. A positive value of the inlet valve lift EV_hub_offset describes an additional opening of the inlet valve by x [mm]. For the carrying-out of the method according to the invention, the currently present correction value KW is processed.

The correction value KW is ascertained in a step S11 by being read out of the engine controller. In general: the higher the absolute value of the correction value, the more likely it is that there are extensive deposits on the inlet valves. The correction value KW is determined as follows:

$$KW = (EV\_hub\_offset/EV\_hub\_offset\_Grenz) * (V\_Grenz/V)$$

Here, "EV_hub_offset_Grenz" is a limit value for the monitoring of the valve lift adaptation, and "V_Grenz" is a limit value for the monitoring of the remaining regulation error of the air masses. The correction value KW is utilized in accordance with the following logic:

In step S12, the correction value KW is compared with a predefined limit value GW. The limit value GW may, for example after the manufacture of the internal combustion engine, be written into a memory, for example of the engine controller or of a database, on a vehicle-specific basis or uniformly for an internal combustion engine type. The limit value GW may in particular be a limit value which takes into consideration manufacturing tolerances of the internal combustion engine. The limit value GW is selected for example to be GW=1, and it is then the case that: if the correction value KW is higher than or equal to 1 (KW≥1), then a critical situation is present. There is the suspicion that coking is present. This suspicion can be validated by means of further checks, which will be described below in steps S21, S22 and S23. Said checks are referred to as quantity deviation tests. If the correction value KW is less than 1 (KW<1), then a non-critical situation is present. It is not to be assumed that coking is present.

In step S12, it is thus ascertained whether the correction value KW exceeds the limit value GW (that is to say KW>=GW) or not (that is to say KW<GW). The result of the comparison is processed further in step S30. The exceedance of the predefined limit value (that is to say KW>=GW) alone constitutes an indication of the presence of coking, which is subsequently verified by carrying out the steps S21, S22 and S23 described below.

The steps S21, S22 and S23 may be carried out at a time before or at a time after the steps S11 and S12. The steps S21, S22 and S23 may likewise be carried out in parallel with the steps S11 and S12, as shown in FIG. 1.

In step S21, a first quantity deviation test is carried out, by means of which a first air ratio value $w_1$ is ascertained. The air ratio value $w_1$ is formed from the quotient of the lambda value $\lambda_{real,\ 1}$ measured during the first quantity deviation test and the desired lambda value $\lambda_{des,\ 1}$ (that is to say the setpoint lambda value) of the fuel combustion in the combustion chambers of the internal combustion engine. In the first quantity deviation test, load control of the internal combustion engine is performed by means of a variable inlet valve lift controller (VVT).

In step S22, a second quantity deviation test is carried out, by means of which a second air ratio value $w_2$ is ascertained. The second air ratio value $w_2$ is formed from the quotient of the lambda value $\lambda_{real,\ 2}$ measured during the second quantity deviation test and the desired lambda value $\lambda_{des,\ 2}$ (that is to say a setpoint lambda value) of the fuel combustion in the combustion chambers of the internal combustion engine. In the second quantity deviation test, the load control of the internal combustion engine is performed by means of the throttle flap in the inlet section of the internal combustion engine.

In step S23, a comparison of the previously ascertained first and second air ratio values $w_1$ and $w_2$ is performed. On the basis of the comparison result VE (that is to say $w_1 < w_2$ or $w_1 = w_2$ or $w_1 > w_2$), the presence of a fault, in particular the presence of coking, in the inlet section of the internal combustion engine can be inferred. The comparison result VE is processed further in step S30.

The first and the second quantity deviation test are performed in succession during idling operation of the internal combustion engine.

The first quantity deviation test carried out in step S21 is carried out with a small or minimal lift of the inlet valve, wherein the throttle flap that is arranged in the inlet section of the internal combustion engine is open. In other words, the first quantity deviation test is carried out in a conventional operating mode of an internal combustion engine which has a variable inlet valve lift controller.

By contrast the second quantity deviation test in step S22 is carried out with a maximum lift of the inlet valve (that is to say the inlet valve is open to a maximum extent) and with the throttle valve substantially closed. This operating mode corresponds to an emergency operating mode in which, in engines with a non-operational variable inlet valve lift controller, the load control is carried out by means of the throttle flap.

Characteristic first and second air ratio values $w_1$, $w_2$ (that is to say $w_1 < w_2$ or $w_1 = w_2$ or $w_1 > w_2$) arise in a manner dependent on whether coking is present, wherein the ratio of said air ratio values to one another is an indication of the presence of coking.

A general fault in the inlet section can be inferred if the first air ratio value $w_1$, which was ascertained in step S21, and the second air ratio value $w_2$, which was ascertained in step S22, are different (that is to say $w_1 \lessgtr w_2$). This results from the fact that the air ratio values $w_1$, $w_2$ would have to have the same value if the lambda values $\lambda_{real,\,1}$ and $\lambda_{real,\,2}$ respectively measured in step S21 and S22 introduce the same air quantity into the combustion chambers with different load control, which would have to be manifest in a respectively equal measured lambda value. By contrast, if the air quantities introduced into the combustion chambers in the steps S21 and S22 differ from one another, then this leads to differences in the lambda values $\lambda_{real,\,1}$ and $\lambda_{real,\,2}$ measured in the steps S21 and S22, whilst the desired lambda values $\lambda_{des,\,1}$, $\lambda_{des,\,2}$ remain unchanged.

Coking has the effect that a carbon-like mass is deposited in the inlet, in particular in the inlet channel and/or on the inlet valve. The gradual growth of the carbon has the effect, in particular in step S21, in which the valve is only minimally open, that the air flow cross section that is otherwise present is reduced to a disproportionately great extent. As a result, a lesser air quantity can flow into the combustion chamber, whereby the measured lambda value $\lambda_{real,\,1}$ becomes smaller. This is manifest in a decrease of the first air ratio value $w_1$. Thus, if the first air ratio value $w_1$ is lower than the second air ratio value $w_2$ (that is to say $w_1 < w_2$), then coking can be inferred. The comparison may be performed in particular in relation to a predefined threshold value, which is selected to be 1, because the respective air ratio characteristic values $w_1$, $w_2$ corresponds to the value 1 if no fault is present, because then the measured and the desired lambda value are approximately equal.

The reverse situation, in which the first air ratio value $w_1$ is higher than the predefined threshold value and higher than the second air ratio value $w_2$ (that is to say $w_1 > w_2$), gives grounds for suspicion that there is a leak in the inlet section, because here, owing to the flow conditions in the second step S22, in which the internal combustion engine is operated with throttling, a smaller air quantity passes into the combustion chambers.

It is in particular expedient if the above-described check is performed on a cylinder-specific basis. For this purpose, the first air ratio value $w_1$ and the second air ratio value $w_2$ are ascertained on a cylinder-specific basis, and a comparison is likewise determined on a cylinder-specific basis. In this way, it is possible not only to make an authoritative statement regarding the presence of a fault or of coking, but even to determine the cylinder that has the fault, or demonstrate a fault intensity per cylinder.

The manner in which the measured lambda values $\lambda_{real,\,1}$ and $\lambda_{real,\,2}$ and the desired lambda values $\lambda_{des,\,1}$ and $\lambda_{des,\,2}$ are ascertained in the first step S21 and the second step S22 is well known to a person skilled in the art. One possible approach is described for example in the applicant's WO 2016/041742 A1.

Furthermore, a person skilled in the art is familiar with further approaches for the cylinder-specific determination of a measured and of a desired lambda value, such that a detailed description of the determination will not be given in the present description.

If it is identified in step S30 that the correction value KW is higher than the limit value GW (KW>GW) and, at the same time, the comparison result VE has the result that $w_1 < w_2$, then coking is inferred because two mutually independent methods each provide an indication of coking. In this case, a fault message can be output via the engine test unit. In all other cases, a fault message can be suppressed, and a warning may be output if necessary.

LIST OF REFERENCE DESIGNATIONS

S11 Method step
S12 Method step
S21 Method step
S22 Method step
S23 Method step
S30 Method step
$\lambda_{real,\,1}$ Measured lambda value in the first quantity deviation test
$\lambda_{real,\,2}$ Measured lambda value in the second quantity deviation test
$\lambda_{des,\,1}$ Desired (setpoint) lambda value in the first quantity deviation test
$\lambda_{des,\,2}$ Desired (setpoint) lambda value in the second quantity deviation test
$w_1$ First air ratio characteristic value
$w_2$ Second air ratio characteristic value
KW Correction value
VE Comparison result
GW Limit value

What is claimed is:

1. A method for detecting coking in an inlet section of an internal combustion engine with direct fuel injection, a throttle flap and a variable inlet valve lift controller, comprising:
    ascertaining a correction value which is offset as an offset value against a preset valve lift by the inlet valve lift controller;
    carrying out a first quantity deviation test by way of which a first air ratio value is ascertained which is formed from a lambda value measured during the first quantity deviation test and a desired lambda value of a fuel combustion in combustion chambers of the internal combustion engine, wherein, in the first quantity deviation test, load control is performed by way of the variable inlet valve lift controller;
    carrying out a second quantity deviation test by way of which a second air ratio value is ascertained which is formed from a lambda value measured during the second quantity deviation test and a desired lambda value of the fuel combustion in the combustion chambers of the internal combustion engine, wherein, in the second quantity deviation test, load control is performed by way of the throttle flap;
    determining a comparison result from the first air ratio value and the second air ratio value; and
    determining whether coking is present in the inlet section of the internal combustion engine by combined evaluation of the comparison result and the correction value.

2. The method according to claim 1, wherein the correction value is read out of an engine controller.

3. The method according to claim 1, wherein the correction value is a value ascertained in relation to a running time of the internal combustion engine by the engine controller.

4. The method according to claim 3, wherein the correction value is a value adapted in relation to the running time of the internal combustion engine by the engine controller, wherein an adaptation is performed from a theoretically calculated air mass value of air flowing into the combustion chambers of the internal combustion engine and a measured air mass value.

5. The method according to claim 1, wherein
the correction value is compared with a predefined limit value, and
a presence of a fault in the inlet section is inferred when the correction value exceeds the predefined limit value.

6. The method according to claim 5, wherein
a fault signal which represents coking is output when, additionally, the first air ratio value and the second air ratio value are different.

7. The method according to claim 1, wherein
the first and/or the second quantity deviation test are carried out during idling operation of the internal combustion engine.

8. The method according to claim 1, wherein
the first quantity deviation test is carried out with a small or minimal lift of the inlet valve and with the throttle flap open.

9. The method according to claim 8, wherein
the second quantity deviation test is carried out with a maximum lift of the inlet valve and with the throttle flap substantially closed.

10. The method according to claim 1, wherein
the second quantity deviation test is carried out with a maximum lift of the inlet valve and with the throttle flap substantially closed.

11. The method according to claim 1, wherein
the first air ratio value and the second air ratio value are ascertained on a cylinder-specific basis, and the comparison result is determined on a cylinder-specific basis.

12. The method according to claim 1, wherein
the first air ratio value is formed by the quotient of the lambda value measured during the first quantity deviation test and the desired lambda value, and
the second air ratio value is formed by the quotient of the lambda value measured during the second quantity deviation test and the desired lambda value.

13. The method according to claim 1, wherein
the presence of coking in the inlet section is inferred when the first air ratio value is lower than a predefined first threshold value and the second air ratio value is higher than the predefined first threshold value.

14. A computer product comprising a non-transitory computer readable medium having stored thereon program code which, when executed on a processor, carries out the acts of:
ascertaining a correction value which is offset as an offset value against a preset valve lift by the inlet valve lift controller;
carrying out a first quantity deviation test by way of which a first air ratio value is ascertained which is formed from a lambda value measured during the first quantity deviation test and a desired lambda value of a fuel combustion in combustion chambers of the internal combustion engine, wherein, in the first quantity deviation test, load control is performed by way of the variable inlet valve lift controller;
carrying out a second quantity deviation test by way of which a second air ratio value is ascertained which is formed from a lambda value measured during the second quantity deviation test and a desired lambda value of the fuel combustion in the combustion chambers of the internal combustion engine, wherein, in the second quantity deviation test, load control is performed by way of the throttle flap;
determining a comparison result from the first air ratio value and the second air ratio value; and
determining whether coking is present in the inlet section of the internal combustion engine by combined evaluation of the comparison result and the correction value.

15. An apparatus, comprising:
an engine test unit that detects faults in an inlet section of an internal combustion engine, wherein the engine test unit is operatively configured to:
ascertain a correction value which is offset as an offset value against a preset valve lift by the inlet valve lift controller;
carry out a first quantity deviation test by way of which a first air ratio value is ascertained which is formed from a lambda value measured during the first quantity deviation test and a desired lambda value of a fuel combustion in combustion chambers of the internal combustion engine, wherein, in the first quantity deviation test, load control is performed by way of the variable inlet valve lift controller;
carry out a second quantity deviation test by way of which a second air ratio value is ascertained which is formed from a lambda value measured during the second quantity deviation test and a desired lambda value of the fuel combustion in the combustion chambers of the internal combustion engine, wherein, in the second quantity deviation test, load control is performed by way of the throttle flap;
determine a comparison result from the first air ratio value and the second air ratio value; and
determine whether coking is present in the inlet section of the internal combustion engine by combined evaluation of the comparison result and the correction value.

* * * * *